April 21, 1925.  
W. B. PARRISH  
1,534,075  
AUXILIARY HANDLE FOR HOES, RAKES, SHOVELS, ETC  
Filed July 27, 1923   2 Sheets-Sheet 1
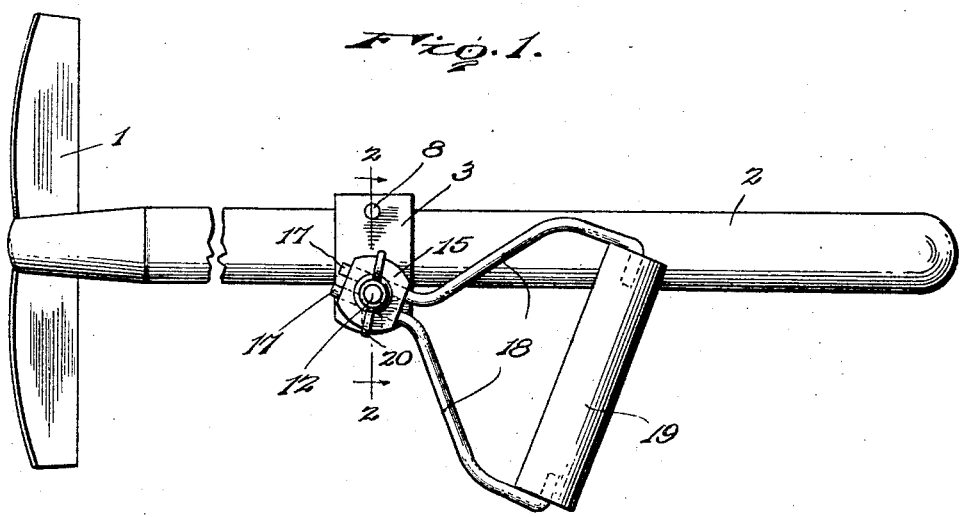
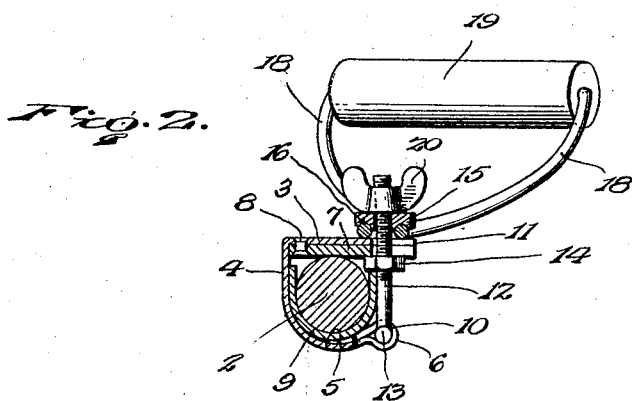
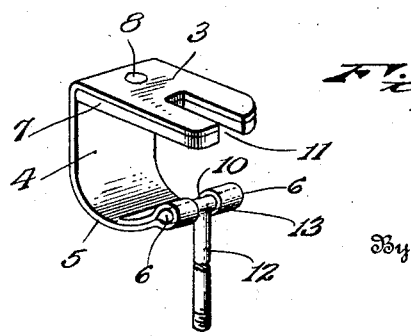
Inventor  
W. B. Parrish.  
By Lacy T Lacey, Attorney April 21, 1925.  1,534,075
W. B. PARRISH
AUXILIARY HANDLE FOR HOES RAKES, SHOVELS, ETC
Filed July 27, 1923   2 Sheets-Sheet 2
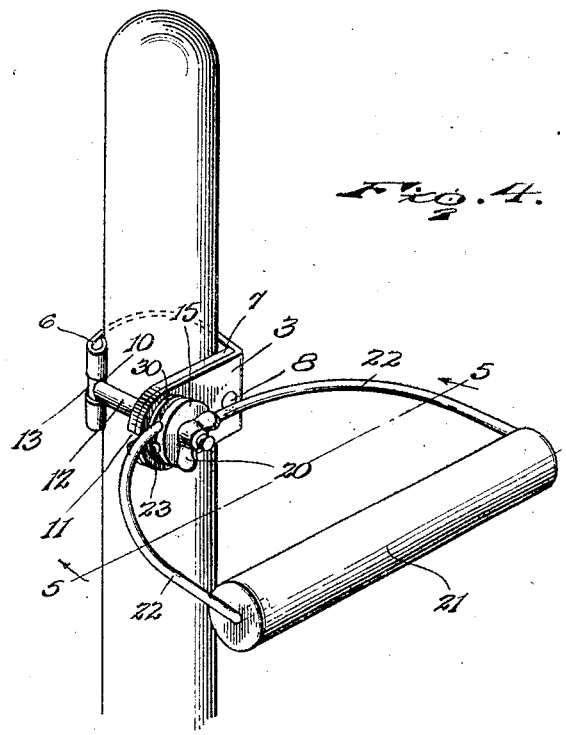
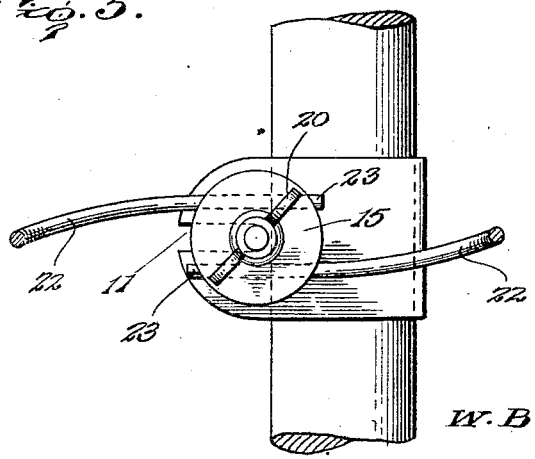
Inventor
W. B. Parrish.
By
Lacy & Lacy, Attorneys Patented Apr. 21, 1925.

1,534,075

UNITED STATES PATENT OFFICE.

WASHINGTON B. PARRISH, OF KENBRIDGE, VIRGINIA.

AUXILIARY HANDLE FOR HOES, RAKES, SHOVELS, ETC.

Application filed July 27, 1923. Serial No. 654,203.

*To all whom it may concern:*

Be it known that I, WASHINGTON B. PARRISH, a citizen of the United States, residing at Kenbridge, in the county of Lunenburg and State of Virginia, have invented certain new and useful Improvements in Auxiliary Handles for Hoes, Rakes, Shovels, Etc., of which the following is a specification.

This invention has for its object the provision of an auxiliary handle for hoes, rakes, shovels, mops, forks, and other tools or implements having a relatively long handle with a working element at one end thereof, whereby the implement may be grasped by the user with a greater degree of comfort than is the case with the ordinary hoe handles and a stronger grip obtained. The invention seeks to provide an attachment which may be readily adjusted to suit the convenience of the user and which may be applied to any hoe handle at a very slight cost. Other objects of the invention will appear incidentally in the course of the following description.

In the drawing, which illustrates one embodiment of my invention,

Figure 1 is a plan view of a hoe having my attachment applied thereto,

Fig. 2 is a section on the line 2—2 of Fig. 1,

Fig. 3 is a detail.

Fig. 4 is a perspective view showing a form of the invention especially adapted for use on cross-cut saws, and Fig. 5 is a detail section of the same.

The hoe comprises the usual blade 1 and handle 2 and is shown merely by way of illustration. In carrying out my invention, I employ a clip or bracket which may conveniently be formed of sheet metal and comprises an upper member 3, a connecting member 4 extending from one end of the said upper member 3 and a lower member 5 which extends from the member 4 and terminates in a pair of eyes or loops 6, the members 3 and 5 spanning the hoe handle, as shown clearly in Fig. 2. The eyes 6 may be conveniently formed by bifurcating the free end of the member 5, as indicated at 10, and then folding or doubling the members of the bifurcation upon themselves, as shown clearly in Figs. 2 and 3. The upper member 3 may be reinforced by a block 7 secured thereto by a rivet 8, and a filler 9 of any convenient or preferred material may be interposed between the hoe handle and the members 4 and 5, as shown clearly in Fig. 2, so as to obtain the requisite tight fit between the handle and the bracket if perchance the diameter of the handle should be less than the space between the upper and lower members of the bracket. Inasmuch as the handle 2 ordinarily tapers slightly toward its lower end or that end to which the blade is attached, the use of the filler may or may not be advisable according to the point along the handle at which the attachment is applied. The upper member 3 of the clip or bracket, together with the reinforcing block or plate 7, is provided with an opening, shown at 11, which may be an openended slot or notch and is alined vertically with the bifurcation 10. A bolt 12 is inserted through the openings 10 and 11, and has a T-head 13 engaged within the eyes or loops 6, as shown in Fig. 2, whereby turning or rotation of the bolt about the axis of its shank will be prevented. The bolt may be also provided with an abutment or lock nut 14 adapted to bear against the under side of the block 7, and this abutment or lock nut will reinforce the free ends of the block 7 and the upper member 3 of the bracket. A clamping plate 15 is mounted upon the bolt 12 above the bracket or clip and is free to slide thereon, the under side of this clamping plate being provided with grooves, indicated at 16, to receive the upper sides of the ends 17 of arms 18 which diverge upwardly from the clamping plate and from the bracket, as shown in the drawing, and carry between their free ends a grip member 19. A wing nut 20 is mounted upon the upper end of the bolt 12 and is adapted to be turned home against the clamping plate 15, as will be readily understood.

In use, the handle 2 is grasped by one hand of the user while the other hand grasps the grip member 19, and it will be readily noted that the grip member 19 is disposed at an angle to the handle 2 so that it may be grasped without any discomfort and the implement may be used for a long period without causing fatigue. The grooves in the under side of the clamping plate 15 effectually prevent spreading apart of the terminals 17 and also retain the said terminals in proper position upon the upper member 3 of the attaching bracket. When the wing nut 20 is turned home, it serves not only to secure the grip member 19 in the desired position but also serves to tighten the members of the bracket around the handle 2 so that a single bolt fastens all the parts in place. The device is exceedingly simple in construction and may be produced and applied at a very low cost. By slightly loosening the wing nut, the grip member 19 may be shifted pivotally about the securing bolt, the clamping plate 15 turning with the terminal members 17, so that the user may place the grip member 19 in such position as proves to be most convenient and least fatiguing to himself. If preferred, the entire device may be removed from the hoe handle and reversed relative to the position shown in the drawing so that it may be placed upon the hoe handle in such position as may be preferred and is best suited to either a right-handed or a left-handed user. It will be understood, of course, that the lock nut 14 is initially set at the lowest possible position upon the securing bolt and the device is then adjusted to the proper position upon the handle and the wing nut 20 turned home, after which the lock nut is turned up against the under side of the reinforcing block or plate 7 so that release of the parts cannot accidentally occur. My attachment will add no appreciable weight to the implement but, when in place, will permit the user to so grasp the implement that greater force may be applied to the blade while at the same time the hand of the user will be so disposed that he will experience less discomfort and less fatigue than in using the ordinary tool. The bolt 12 will be retained in the eyes or loops 6 at all times and may be easily swung pivotally about its head to permit the attachment to be removed from the handle or to be brought into securing position after the attachment has been placed on the handle.

In the form shown in Figs. 4 and 5, the construction and arrangement of the clamping and securing members are the same as in the form shown in Figs. 1, 2 and 3. The auxiliary handle or grip member 21, however, is equipped with arcuate side members 22 which have their terminals 23 arranged in parallel overlapping relation so that they enter the grooves in the clamping plate from opposite sides of the plate instead of from the same side thereof. This form of auxiliary handle is adjustable in the same manner and to the same extent as the first described form but is especially adaptable to the handles of cross-cut saws. A washer 30 having grooves in its face is inserted between the terminals 23 and the clamping plate so as to aid in preventing spreading of the terminals and also to bridge the notches 11.

Having thus described the invention, what is claimed as new is:

1. An attachment for implement handles comprising an auxiliary handle, an attaching bracket, and means for securing the bracket and the auxiliary handle upon the implement handle, the auxiliary handle being pivotally movable upon the bracket and including a grip member disposed at an angle to the axis of pivotal movement.

2. An attachment for implement handles comprising a bracket adapted to be fitted around the handle, an auxiliary handle resting upon the said bracket, and a single means for securing the bracket upon the hoe handle and the auxiliary handle upon the bracket, the auxiliary handle being pivotally movable about the securing means and including a grip member disposed at an angle to the axis of pivotal movement.

3. An attachment for implement handles comprising a bracket adapted to fit around the handle, an auxiliary handle comprising arms having terminal portions lying across the top of said bracket and a grip member carried by said arms, a securing bolt inserted through the bracket to secure the same upon the handle, said arms being pivotally movable about said bolt, and means mounted on said bolt, and engaging the terminal portions of the arms to secure said arms upon the bracket in a set relation to the bolt, the grip member being disposed at an angle to the axis of the securing bolt.

4. An attachment for implement handles comprising a bracket adapted to fit around the handle, an auxiliary handle comprising a grip member and arms carrying said grip member and having spaced terminal portions resting upon the bracket, a clamping plate bearing upon said terminal portions and having grooves in its under side engaging said portions, a securing bolt inserted through the ends of the bracket and passing between said terminal portions and through the clamping plate, and a nut mounted on said bolt and bearing upon said clamping plate.

5. An attachment for handles comprising a bracket adapted to fit around the handle and having a lower member provided with a pair of terminal eyes and an upper member having an opening therethrough, a grip member, arms carrying said grip member and having spaced terminal portions resting on the upper side of the bracket, a clamping plate bearing upon and engaging said terminal portions, a bolt inserted upwardly through the members of the bracket and having a T-head engaging in the said terminal eyes, the bolt passing through the opening in the upper portion of the bracket and through the said clamping plate, an element on the bolt bearing against the under side of the upper member of the bracket, and a securing nut mounted on the end of the bolt and bearing upon the clamping plate.

In testimony whereof I affix my signature.

WASHINGTON B. PARRISH. [L. S.]